United States Patent
Nishihara et al.

(10) Patent No.: US 8,563,465 B2
(45) Date of Patent: Oct. 22, 2013

(54) HYDROGEN STORAGE MATERIAL

(75) Inventors: Hiroshi Nishihara, Tokyo (JP); Tetsu Yonezawa, Tokyo (JP); Yoshinori Yamanoi, Tokyo (JP); Yuki Yamamoto, Tokyo (JP); Yoshihiro Kobori, Yokohama (JP); Shinji Oshima, Yokohama (JP); Yukio Kobayashi, Yokohama (JP); Shunsuke Maekawa, Yokohama (JP)

(73) Assignees: JX Nippon Oil & Energy Corporation, Tokyo (JP); The University of Tokyo, Tokyo (JP)

( * ) Notice: Subject to any disclaimer, the term of this patent is extended or adjusted under 35 U.S.C. 154(b) by 165 days.

(21) Appl. No.: 12/997,406

(22) PCT Filed: Jun. 16, 2009

(86) PCT No.: PCT/JP2009/060948
§ 371 (c)(1),
(2), (4) Date: Feb. 28, 2011

(87) PCT Pub. No.: WO2009/154200
PCT Pub. Date: Dec. 23, 2009

(65) Prior Publication Data
US 2011/0160456 A1 Jun. 30, 2011

(30) Foreign Application Priority Data
Jun. 17, 2008 (JP) ............... P2008-158150

(51) Int. Cl.
*B01J 20/22* (2006.01)

(52) U.S. Cl.
USPC ............... 502/401; 546/12; 556/22; 556/136

(58) Field of Classification Search
USPC ............... 502/401; 556/22, 136; 546/12
See application file for complete search history.

(56) References Cited

U.S. PATENT DOCUMENTS

2006/0252641 A1* 11/2006 Yaghi et al. ............ 502/401

FOREIGN PATENT DOCUMENTS

| JP | 2006-342249 | 12/2006 |
| JP | 2007-167820 | 7/2007 |
| JP | 2008-266269 | 11/2008 |
| JP | 2009-96723 | 5/2009 |
| JP | 2006-218346 | 8/2010 |

OTHER PUBLICATIONS

Culp et al., "Hydrogen Storage Properties of Rigid Three-Dimensional Hofmann Clathrate Derivatives; The Effects of Pore Size", American Chemical Society, Feb. 2, 2008, pp. 7079-7083.
Bemis et al., "H12 Pd28 (PtPMe3)12(CO)27, a High-Nuclearity Pd28Pt13 Cluster Containing 12 Hydrido Atorms: A possible Molecular Hydrogen-Storage Model for Palladium metal", American Chemical Society, May 14, 1997, pp. 4545-4546.
H. Tamura et al., "Hydrogen storage Alloys . . . ", , 1998, pp.

(Continued)

*Primary Examiner* — Colleen Dunn
*Assistant Examiner* — Haytham Soliman
(74) *Attorney, Agent, or Firm* — Greenblum & Bernstein, P.L.C.

(57) ABSTRACT

The hydrogen storage material of the invention is a hydrogen storage material comprising metal fine particles with hydrogen storage capacity, and an organic compound that has at least two specific groups that can bind with the metal fine particles, and that is bonded with the metal fine particles by the specific groups.

7 Claims, 10 Drawing Sheets

(56) References Cited

OTHER PUBLICATIONS

Bemis et al., "H12 Pd28 (PtPMe3)12(CO)27, a High-Nuclearity Pd28Pt13 Cluster Containing 12 Hydrido Atorms: A possible Molecular Hydrogen-Storage Model for Palladium metal", American Chemical Society, May 14, 1997, vol. 119, No. 19.

Culp et al., "Hydrogen Storage Properties of Rigid Three-Dimensional Hofmann Clathrate Derivatives; The Effects of Pore Size", American Chemical Society, Feb. 2, 2008, vol. 112, No. 17.
International Preliminary Report on Patentability for PCT/JP2009/060948, mailed Feb. 8, 2011.

* cited by examiner

HYDROGEN STORAGE MATERIAL

TECHNICAL FIELD

The present invention relates to a hydrogen storage material, and specifically it relates to a hydrogen storage material for storage of hydrogen gas, to be potentially used in fuel cell automobiles, hydrogen transport trailers, hydrogen internal combustion engines and the like.

BACKGROUND ART

Active research is being conducted on physical storage of hydrogen in porous structures such as zeolite or active carbon, as conventional hydrogen storage materials, as well as on hydrogen storage alloys.

For example, Patent document 1 describes the use of a porous metal complex as a porous compound. Patent document 1 discloses a technique for design and control of uniform micropores as a porous material for gas adsorption, composed of a metal and an organic material, whereby the gas storage capacity is increased.

Also, Non-patent document 1 discloses a method for lowering the hydrogen absorption temperature and release temperature by alloying a metal with hydrogen absorption capacity.

CITATION LIST

Patent Literature

[Patent document 1] Japanese Unexamined Patent Application Publication No. 2006-342249

Non Patent Literature

[Non-patent document 1] Tamura, H. ed., "Hydrogen Storage Alloys—From Basic To Cutting-Edge Technology", NTS Inc. (1998).

SUMMARY OF INVENTION

Technical Problem

The invention described in Patent document 1, however, can potentially have insufficient hydrogen absorption capacity.

The hydrogen absorption capacity is also insufficient at times even with the technology described in Non-patent document 1.

It is an object of the present invention, which has been accomplished in light of the aforementioned problems of the prior art, to provide a hydrogen storage material with excellent hydrogen storage capacity.

Solution to Problem

In order to achieve the object stated above, the invention provides a hydrogen storage material comprising metal fine particles with hydrogen storage capacity, and an organic compound that has at least two specific groups that can bind with the metal fine particles, and that is bonded with the metal fine particles by the specific groups.

Such a hydrogen storage material can increase the hydrogen storage capacity compared to using only metal fine particles. The reason for the increased hydrogen storage capacity is not thoroughly understood, but the present inventors offer the following conjecture. That is, because the hydrogen storage material of the invention has a structure with an organic compound bonded to metal fine particles, the adhesion between the metal fine particles is inhibited by the organic compound, and the hydrogen-contacting surface area of the metal fine particles increases, thus resulting in greater hydrogen storage capacity. In addition, voids are formed between the metal fine particles due to the presence of the organic compound, and it is thus possible for hydrogen to be physically stored in the gaps. Presumably, if the organic compound has two or more specific groups, it is easier to form a two-dimensional or three-dimensional network structure in which the metal fine particles and organic compound are alternately bonded, thus facilitating formation of voids that permit physical storage of hydrogen. In the hydrogen storage material of the invention, therefore, it is believed that hydrogen is chemically stored in the metal fine particles while being physically stored by the voids between the metal fine particles as well, thus allowing the hydrogen storage capacity to be increased.

The metal fine particles in the hydrogen storage material of the invention are preferably particles comprising at least one type of metal selected from the group consisting of Pd, V and Ti. The metal included in the metal fine particles allows excellent chemical storage capacity for hydrogen to be obtained with the metal fine particles. The hydrogen storage capacity of the hydrogen storage material can thus be further increased.

The organic compound in the hydrogen storage material of the invention is preferably a compound with an aromatic ring. The rigidity of the organic compound molecules increases with an aromatic ring, and adhesion between the metal fine particles can be more fully inhibited, while also allowing voids to be formed more satisfactorily between the metal fine particles. With the hydrogen storage material, therefore, it is possible to further increase both the chemical storage capacity for hydrogen by the metal fine particles and the physical storage capacity for hydrogen by the voids between the metal fine particles, and thus to further increase the hydrogen storage capacity.

The organic compound in the hydrogen storage material of the invention is preferably a compound having at least one specific group selected from the group consisting of isocyano, pyridyl and phosphino groups. These specific groups bond more easily with metal fine particles by coordination bonding and provide a stable bonded state, to more stably exhibit an effect of inhibiting adhesion between metal fine particles in the hydrogen storage material, and an effect of forming voids between metal fine particles. The hydrogen storage capacity of the hydrogen storage material can thus be more stably increased.

The hydrogen storage material of the invention preferably has a structure wherein two or more metal fine particles are bonded through the organic compound. By having two or more metal fine particles linked by the organic compound in this manner, it is possible to more fully inhibit adhesion between the metal fine particles, while also allowing voids to be formed more satisfactorily between the metal fine particles. With the hydrogen storage material, therefore, it is possible to further increase both the chemical storage capacity for hydrogen by the metal fine particles and the physical storage capacity for hydrogen by the voids between the metal fine particles, and thus to further increase the hydrogen storage capacity. This effect is exhibited more effectively if the organic compound has appropriate rigidity.

Also preferably, a plurality of organic compounds having two or more specific groups are bonded in the metal fine particles in the hydrogen storage material, with the organic compounds being further bonded to other metal fine particles. This will allow formation of a two-dimensional or three-dimensional network structure with the metal fine particles and organic compound alternately bonded, and will drastically increase the physical storage capacity for hydrogen, to vastly increase the hydrogen storage capacity of the hydrogen storage material.

Advantageous Effects of Invention

According to the invention it is possible to provide a hydrogen storage material with excellent hydrogen storage capacity.

DESCRIPTION OF EMBODIMENTS

Preferred embodiments of the invention will now be described in detail.

The hydrogen storage material of the invention is a hydrogen storage material comprising metal fine particles with hydrogen storage capacity, and an organic compound that has at least two specific groups that can bind with the metal fine particles, and that is bonded with the metal fine particles by the specific groups. Each of these constituent components will now be explained.

The metal fine particles are not particularly restricted so long as they have hydrogen storage capacity. The metal fine particles are composed of, for example, a metal having hydrogen storage capacity. Examples of metals composing the metal fine particles include Pd, V, Ti, Mg, Ni and Pt. The metal fine particles are preferably particles comprising at least one type of metal selected from the group consisting of Pd, V and Ti. The metals composing the metal fine particles may be used as single metals alone, or two or more thereof may be used in combination. When two or more metals are used, they may be used as an alloy.

The mean particle size of the metal fine particles is preferably 0.1-100 nm, more preferably 1-10 nm and most preferably 2-8 nm. If the mean particle size of the metal fine particles is less than 0.1 nm, the hydrogen chemical storage capacity of the metal fine particles will tend to be lowered, and if it exceeds 100 nm, the hydrogen physical storage capacity by the voids between the metal fine particles will tend to be lowered. Particularly when the mean particle size of the metal fine particles is within the range of 1-10 nm, both the hydrogen chemical storage capacity by the metal fine particles and the hydrogen physical storage capacity by the voids between the metal fine particles are highly satisfactory, and it is possible to obtain more excellent hydrogen storage capacity for the hydrogen storage material. Also, if the mean particle size of the metal fine particles is within the range of 1-10 nm, it will be easier to form a two-dimensional or three-dimensional network structure having the metal fine particles and organic compound alternately bonded, thus allowing the hydrogen storage capacity of the hydrogen storage material to be vastly improved.

The mean particle size of the metal fine particles is determined by measuring the particle sizes of the metal fine particles by observing the hydrogen storage material under a transmission electron microscope, and calculating the mean value of the measured particle size.

The organic compound has two or more specific groups that can bond with the metal fine particles, and it bonds with the metal fine particles by the specific groups in the hydrogen storage material. The organic compound is not particularly restricted, but it is preferably a compound with suitable rigidity, since this is advantageous for inhibiting adhesion between metal fine particles and forming sufficient voids between metal fine particles. The organic compound is preferably a compound with an aromatic ring in order to obtain suitable rigidity. The aromatic ring may be an aromatic hydrocarbon ring or an aromatic heterocyclic ring, but an aromatic hydrocarbon ring is preferred, and a benzene ring is especially preferred. The organic compound may have a single aromatic ring, or two or more. If the organic compound has two or more aromatic rings, the aromatic rings may be the same or different.

The specific groups in the organic compound are not particularly restricted so long as they are groups that can bond with the metal fine particles through coordination bonds, covalent bonds, ionic bonds or the like. The specific groups may be, specifically, isocyano, pyridyl, phosphino, sulfonyl, carboxyl or hydroxyl groups. Of these, isocyano, pyridyl and phosphino groups are preferred for more satisfactory bonding with the metal fine particles. Two or more specific groups in the organic compound may be the same or different.

The hydrogen storage material preferably has a structure wherein two or more metal fine particles are bonded through an organic compound having two or more specific groups. This will more adequately inhibit adhesion between metal fine particles, while also more adequately forming voids between metal fine particles and further increasing the hydrogen storage capacity of the hydrogen storage material.

The organic compound also preferably has specific groups on both ends of the molecule. When two or more metal fine particles are bonded through the organic compound in this manner, the metal fine particles bond at both ends of the organic compound, and therefore adhesion between metal fine particles can be more adequately inhibited, while voids can be more adequately formed between metal fine particles, and the hydrogen storage capacity of the hydrogen storage material can be further increased.

The lengths of the organic compound molecules are preferably 0.5-20 nm and more preferably 0.7-10 nm. The length of an organic compound molecule is the distance between one end bonded to a metal fine particle and the other end having the furthest specific group from the first end. The molecule length can be determined from the structure of the organic compound used. If the lengths of the molecules are less than 0.5 nm, the physical storage capacity for hydrogen by the voids between the metal fine particles will tend to be reduced, and if they are greater than 20 nm the hydrogen storage capacity will tend to be reduced.

There are no particular restrictions on the molecular weight of the organic compound, but from the viewpoint of improving the efficiency of the hydrogen storage capacity of the hydrogen storage material, it is preferably 50-2000 and more preferably 100-1800.

Specific examples of these organic compounds include 1,4-phenylenediisocyanide, 4,4'-diisocyanobiphenyl, 4,4'-diisocyano-p-terphenyl, 4,4'-(diphenylphosphino)biphenyl, 4,4'-biphenyldithiol and 4',4''''-(1,4-phenylene)bis(2,2':6',2''-terpyridine).

There are no particular restrictions on the content ratio of the organic compound and metal fine particles in the hydrogen storage material, but the content of the metal fine particles in the total hydrogen storage material is preferably 10-90 mass % and more preferably 30-70 mass %. If the content is less than 10 mass %, the hydrogen chemical storage capacity of the metal fine particles will tend to be lowered, and if it exceeds 90 mass %, the hydrogen physical storage capacity by the voids between the metal fine particles will tend to be lowered.

The hydrogen storage material described above can be produced by, for example, dissolving a metal-containing compound such as a metal chloride as the starting material in a solution, and then reducing it with a reducing agent while protecting the metal molecule with a surfactant to synthesize metal fine particles, and then adding an organic compound with a coordination property to bond it to the metal fine particles. The method for producing the hydrogen storage material is not limited to the one described above.

EXAMPLES

The present invention will now be explained in greater detail based on examples and comparative examples, with the understanding that the invention is in no way limited to the examples.

Example 1

Synthesis of Dichlorobisacetonitrilepalladium(II)

After dissolving 24.8 g of palladium chloride (product of Tanaka Holdings Co., Ltd.) in 625 mL of dehydrated acetonitrile (product of Wako Pure Chemical Industries, Ltd., reagent grade) in air, the mixture was vigorously stirred at room temperature for 3 days. Upon completion of the reaction, the solution was filtered out the solid by suction filter, and the solid was vacuum dried overnight at room temperature to obtain 30.3 g of orange dichlorobisacetonitrilepalladium(II) (83% yield).

Synthesis of 1,4-phenylenediisocyanide-palladium Fine Particle Complex

There were dissolved 2.59 g of the synthesized dichlorobisacetonitrilepalladium(II) and 21.87 g of tetra-n-octylammonium bromide (product of Alfa Aesar) in 320 mL of dehydrated tetrahydrofuran (product of Wako Pure Chemical Industries, Ltd., reagent grade), under a nitrogen atmosphere, to prepare a dichlorobisacetonitrilepalladium(II) solution. A 30 mL portion of a 1 M triethylborolithium hydride/tetrahydrofuran solution (product of Kanto Kagaku Co., Ltd.), as a reducing agent, was added all at once to the solution, and the mixture was stirred for one hour at room temperature. Upon completion of stirring, 1.0 g of 1,4-phenylenediisocyanide (product of Aldrich) was added and the mixture was stirred overnight at room temperature. Next, the pressure was reduced while keeping a nitrogen atmosphere for removal of the tetrahydrofuran, for concentration to a solvent volume of about a few mL. After then adding 100 mL of dehydrated methanol (product of Wako Pure Chemical Industries, Ltd., reagent grade) to the obtained concentrate for washing, the washing solution was filtered by bridge filtration. After washing twice, the product was washed with acetonitrile and methanol in air. After washing, the product was dried under reduced pressure to obtain 2.43 g of a 1,4-phenylenediisocyanide-palladium fine particle complex as a hydrogen storage material.

Analysis of 1,4-phenylenediisocyanide-palladium Fine Particle Complex

Figure 1:
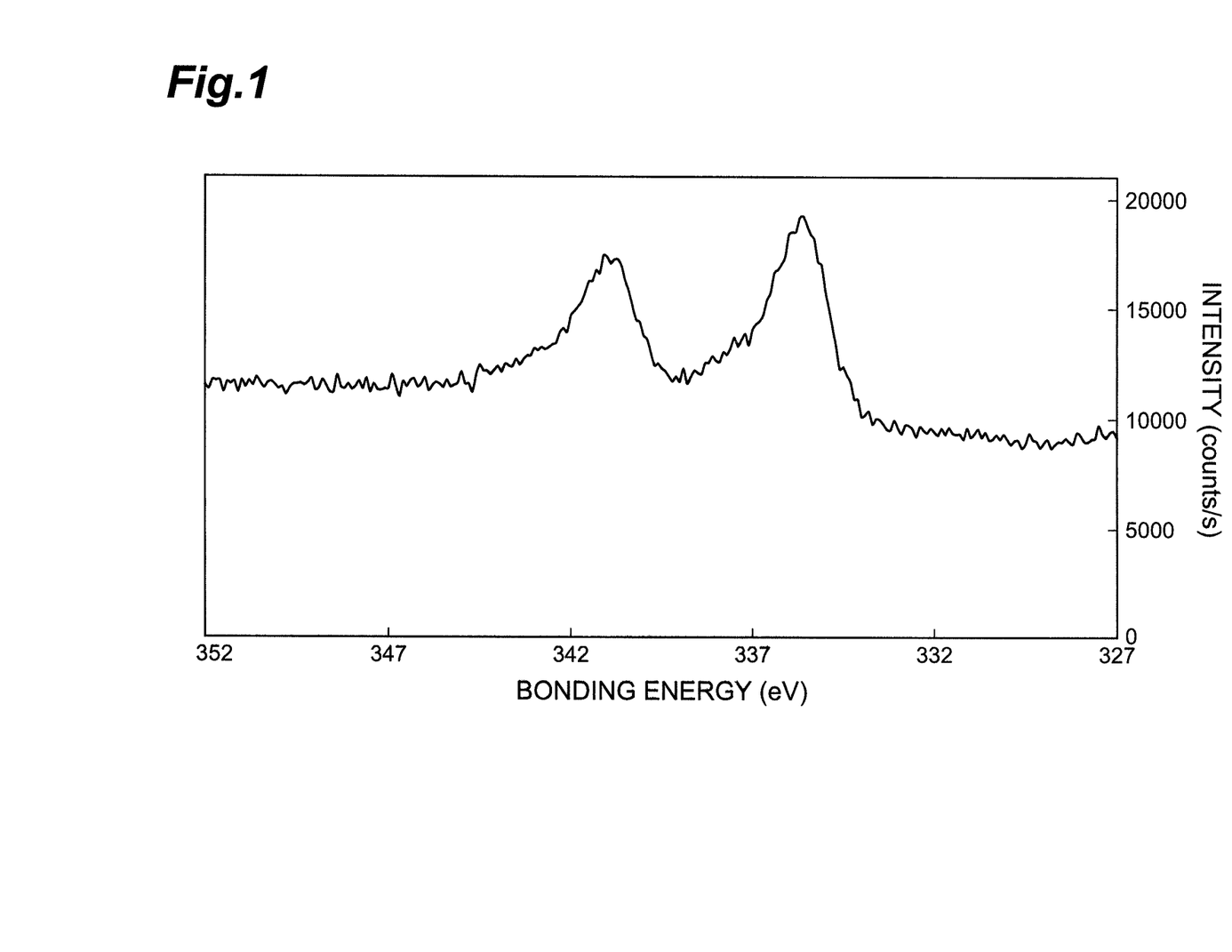
FIG. 1 is a graph showing the XPS spectrum for the hydrogen storage material obtained in Example 1.
Figure 2:
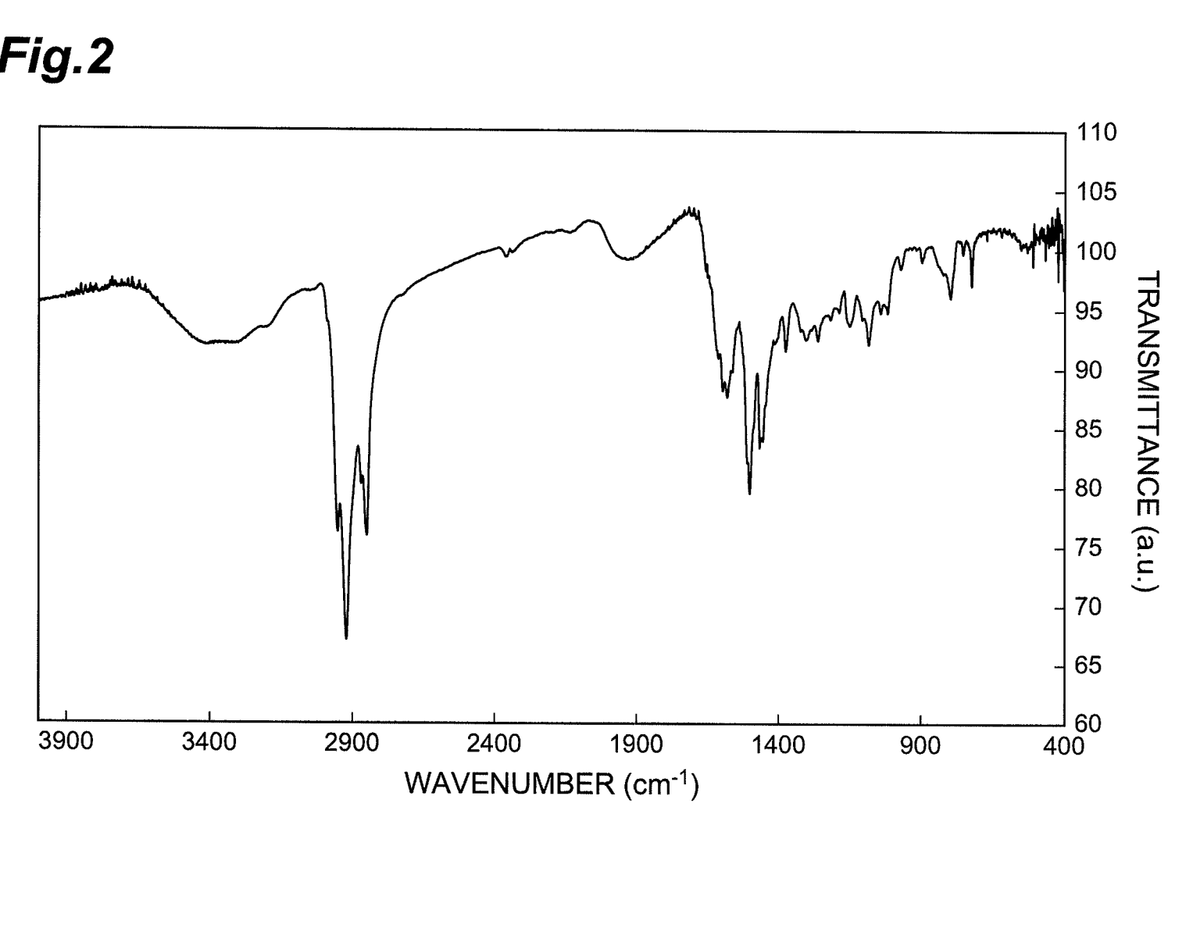
FIG. 2 is a graph showing the IR spectrum for the hydrogen storage material obtained in Example 1.
Figure 3:
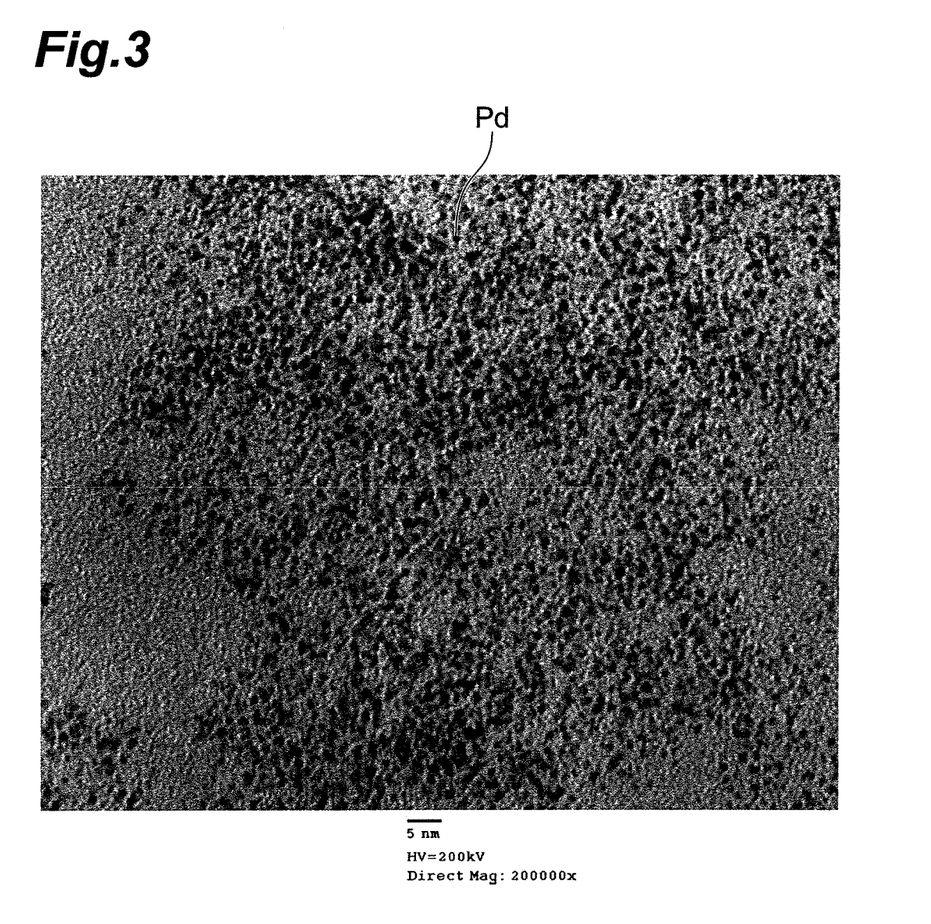
FIG. 3 is a transmission electron microscope photograph (200,000× magnification) of the hydrogen storage material obtained in Example 1.
Figure 4:
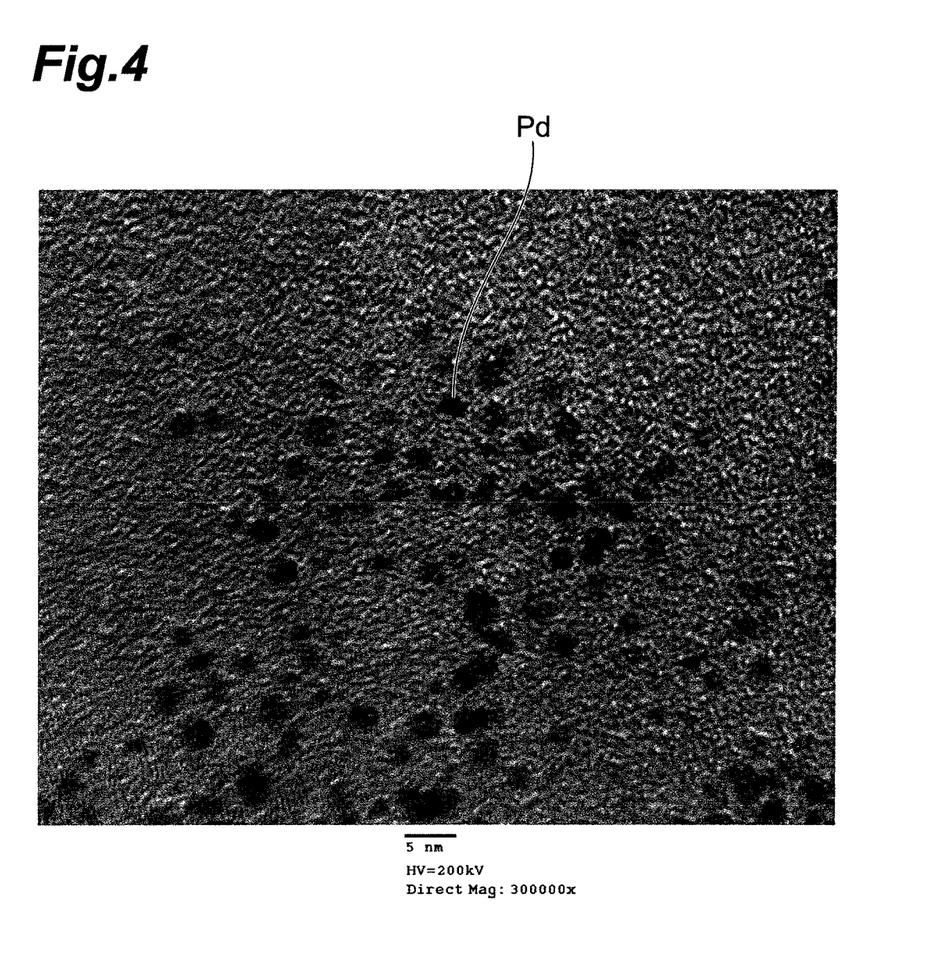
FIG. 4 is a transmission electron microscope photograph (300,000× magnification) of the hydrogen storage material obtained in Example 1.
Figure 5:
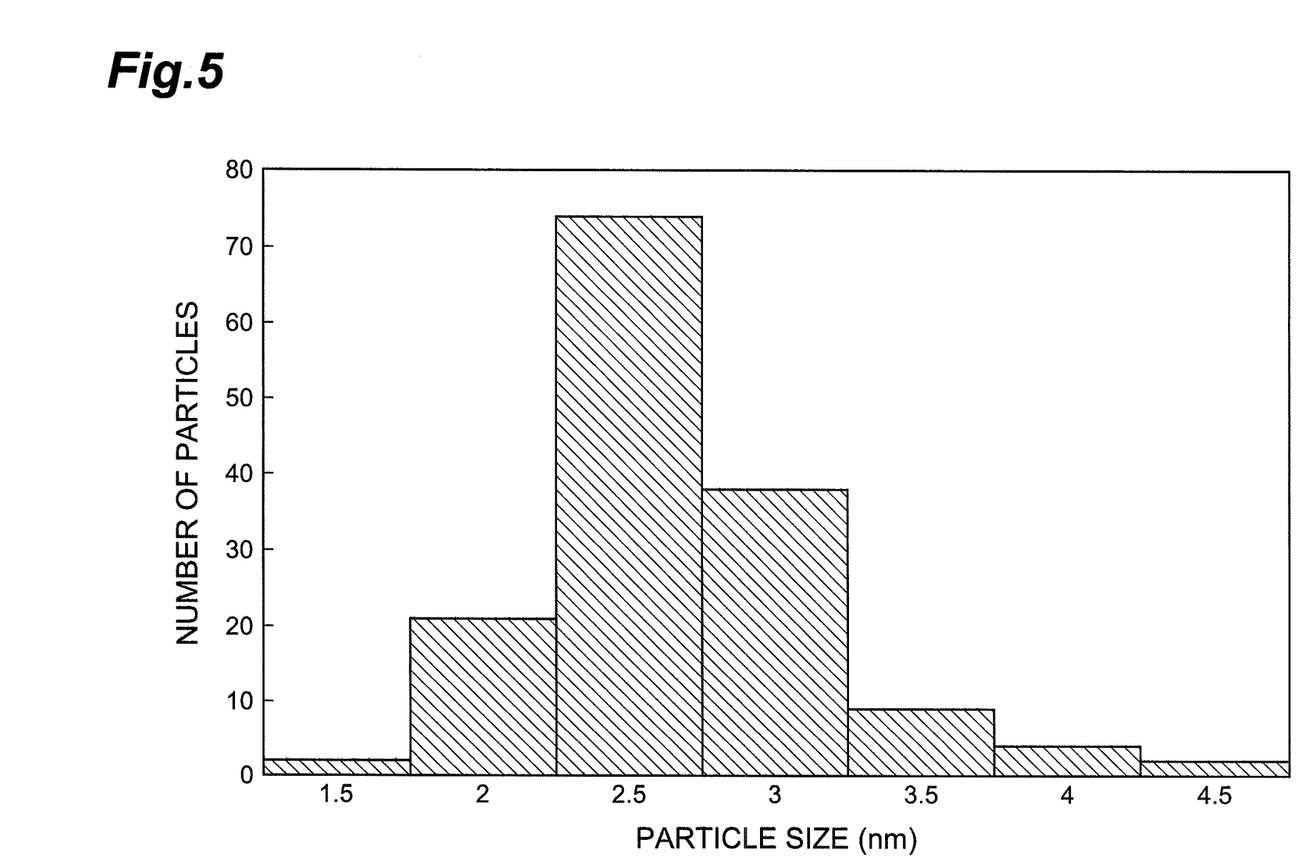
FIG. 5 is a graph showing the particle size distribution of palladium fine particles in the hydrogen storage material obtained in Example 1.

The obtained 1,4-phenylenediisocyanide-palladium fine particle complex was subjected to X-ray photoelectron spectroscopy (XPS, Rigaku XPS-7000) measurement, infrared absorption spectroscopy (IR, Jasco FT/IR-620 spectrometer) measurement and transmission electron microscope (FE-TEM, Hitachi HF-2000) analysis. The obtained XPS spectrum is shown in FIG. 1, the IR spectrum is shown in FIG. 2, and TEM images are shown in FIG. 3 (200,000× magnification) and FIG. 4 (300,000× magnification). The TEM images in FIG. 3 and FIG. 4 were obtained by observing a material obtained by dropping a palladium fine particle dispersion comprising a 1,4-phenylenediisocyanide-palladium fine particle complex dispersed in chloroform, onto a board such as a TEM support film, and drying it in air at room temperature, and the "Pd" in the drawings are palladium fine particles. As a result of measuring the particle sizes of 150 arbitrary palladium fine particles from the TEM image, the mean particle size of the palladium fine particles was found to be 2.43 nm. The particle size distribution of the palladium fine particles is shown in FIG. 5. In the abscissa in FIG. 5 (particle size), "1.5" indicates a particle size range of greater than 1.0 nm and not greater than 1.5 nm, "2" indicates greater than 1.5 nm and not greater than 2.0 nm, "2.5" indicates greater than 2.0 nm and not greater than 2.5 nm, "3" indicates greater than 2.5 nm and not greater than 3.0 nm, "3.5" indicates greater than 3.0 nm and not greater than 3.5 nm, "4" indicates greater than 3.5 nm and not greater than 4.0 nm, and "4.5" indicates greater than 4.0 nm and not greater than 4.5 nm.

A peak was detected at 340.9 eV and 335.4 eV in the results of XPS measurement. These peak values correspond to peak values for palladium metal, thus suggesting that the palladium was in the metallic state (0 valency).

Also, a peak was detected near 2000 $cm^{-1}$ in the results of IR measurement, thus suggesting that the 1,4-phenylenediisocyanide was bonded to the palladium fine particles. A peak is detected near 2100 $cm^{-1}$ for 1,4-phenylenediisocyanide alone, but presumably coordination of 1,4-phenylenediisocyanide with the metal caused a shift of the peak, so that it was detected near 2000 $cm^{-1}$.

Comparative Example 1

Palladium black (product of Nilaco Corp., 99.9% palladium powder, 100 mesh (approximately 140 μm)), and this was used as the hydrogen storage material for Comparative Example 1.

Comparative Example 2

Synthesis of Pentyl Isocyanide-Palladium Fine Particle Complex

There were dissolved 1.30 g of dichlorobisacetonitrilepalladium(II) synthesized using the same method as Example 1 and 10.94 g of tetra-n-octylammonium bromide (product of Alfa Aesar) in 160 mL of dehydrated tetrahydrofuran (product of Wako Pure Chemical Industries, Ltd., reagent grade), under a nitrogen atmosphere, to prepare a dichlorobisacetonitrilepalladium(II) solution. A 15 mL portion of a 1 M triethylborolithium hydride/tetrahydrofuran solution (product of Kanto Kagaku Co., Ltd.), as a reducing agent, was added all at once to the solution, and the mixture was stirred for one hour at room temperature. Upon completion of stirring, 1.5 mL of pentyl isocyanide (product of Aldrich) was added and the mixture was stirred for one hour at room temperature. Next, the pressure was reduced while keeping a nitrogen atmosphere, for removal of the tetrahydrofuran, for concentration to a solvent volume of about a few mL. After then adding 60 mL of dehydrated methanol (product of Wako Pure Chemical Industries, Ltd., reagent grade) to the obtained concentrate for washing, the washing solution was filtered by bridge filtration. After washing twice, the product was washed with acetonitrile and methanol in air. After washing, the product was dried under reduced pressure to obtain 0.72 g of a pentyl isocyanide-palladium fine particle complex (mean particle size of palladium fine particles: 2.43 nm), as a hydrogen storage material.

<Measurement of Hydrogen Storage Capacity>

Figure 6:
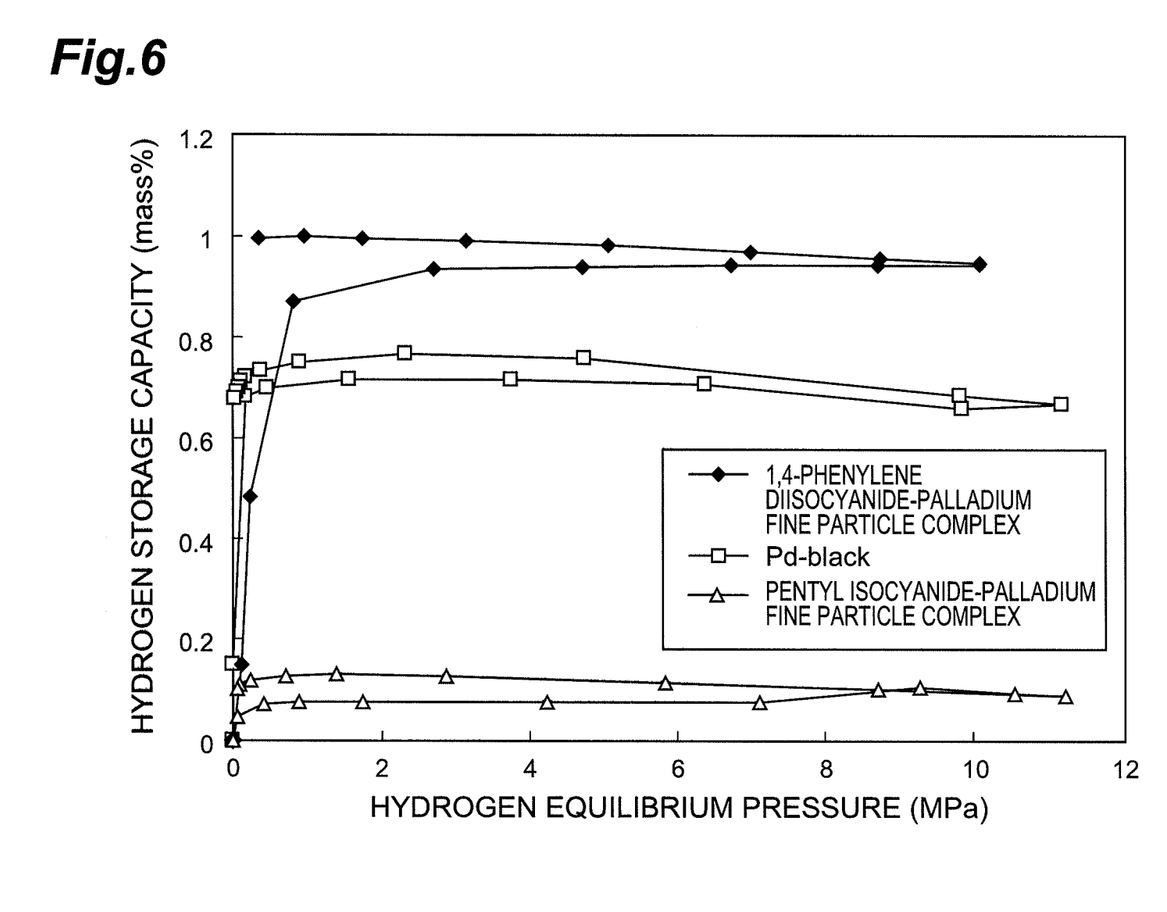
FIG. 6 is a graph showing the relationship between the equilibrium pressure and hydrogen storage capacity at a temperature of 303 K, for the hydrogen storage materials obtained in Example 1 and Comparative Examples 1-2.

The hydrogen storage materials obtained in Example 1 and Comparative Examples 1 and 2 were used for measurement of the hydrogen storage capacity at a temperature of 303 K. The hydrogen storage capacity was measured using a hydrogen storage capacity measuring apparatus by Rhesca Corp., with the sample tube section in the hydrogen storage material immersed in a 303 K water tank. The relationship between the equilibrium pressure and hydrogen storage capacity at 303 K is shown in FIG. 6. The hydrogen storage capacity shown in FIG. 6 is the hydrogen storage capacity per hydrogen storage material.

For the 1,4-phenylenediisocyanide-palladium fine particle complex of Example 1, the hydrogen storage capacity at a temperature of 303 K and a hydrogen pressure of 10 MPa was 0.94 mass %. When the IR spectrum of the hydrogen storage material obtained in Example 1 was measured before hydrogen storage and after storage and compared, no significant change was found. This suggested that the 1,4-phenylenediisocyanide itself was not storing hydrogen. On the other hand, the palladium black (Pd-black) of Comparative Example 1 had a hydrogen storage capacity of 0.67 mass % at a temperature of 303 K and a hydrogen pressure of 11 MPa. Also, the pentyl isocyanide-palladium fine particle complex of Comparative Example 2 had a hydrogen storage capacity of 0.10 mass % at a temperature of 303 K and a hydrogen pressure of 11 MPa.

Example 2

Synthesis of Phosphine Ligand

In a three-necked flask, under a nitrogen atmosphere, there were placed 1.22 g (3 mmol) of 4,4'-diiodobiphenyl (product of Tokyo Kasei Kogyo Co., Ltd.), 0.11 g (0.6 mmol) of copper(I) iodide (product of Wako Pure Chemical Industries, Ltd.) and 3.26 g (12 mmol) of cesium carbonate (Wako Pure Chemical Industries, Ltd.). Next, 50 mL of dehydrated toluene (product of Wako Pure Chemical Industries, Ltd.) and 25 mL (9 mmol) of a hexane solution of diphenylphosphine (diphenylphosphine content: 10 mass %, product of Sterm) were added to the flask, and the mixture was heated to reflux for 24 hours. The reaction mixture was then cooled to room temperature and filtered with Celite. After filtration, the solvent was distilled off under reduced pressure and purified by silica gel column chromatography (silica gel, hexane:dichloromethane=2:1), to obtain 650 mg 4,4'-bis(diphenylphosphino)biphenyl represented by the following formula (1) (1.2 mmol, 42% yield), as a phosphine ligand.

[Chemical Formula 1]

(1)

Synthesis of Phosphine Ligand-Palladium Fine Particle Complex

Figure 7:
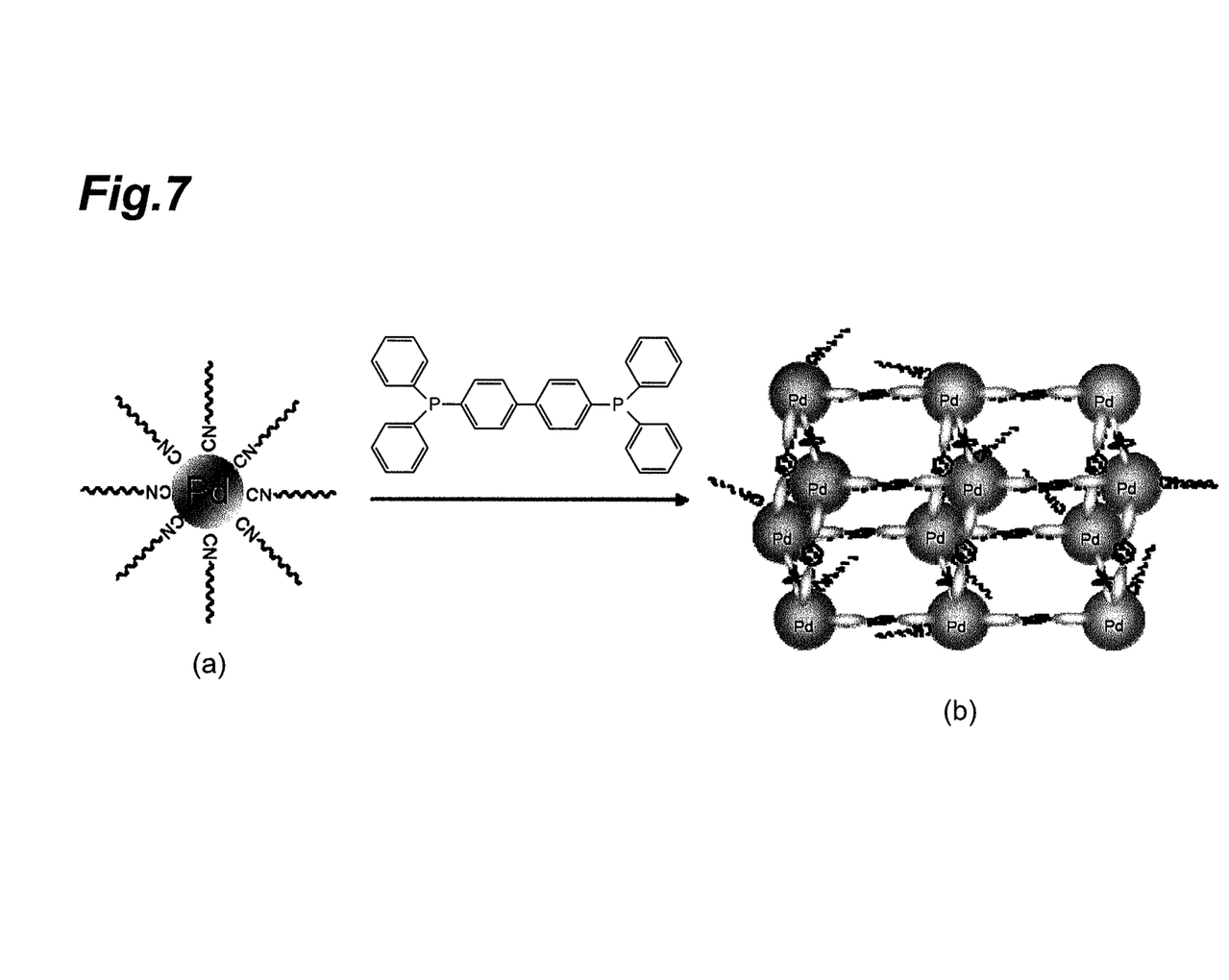
FIG. 7 is a drawing illustrating the ligand exchange reaction in Example 2.

After suspending 105.3 mg (0.2 mmol) of the synthesized 4,4'-bis(diphenylphosphino)biphenyl and 1.22 g of the pentyl isocyanide-palladium fine particle complex obtained in Comparative Example 2 in 50 mL of dehydrated chloroform (product of Kanto Kagaku Co., Ltd.), under a nitrogen atmosphere, the mixture was stirred at room temperature for 9 days. Next, 7.4 mg of 4,4'-bis(diphenylphosphino)biphenyl was further added and the mixture was stirred for 7 days. This promoted ligand-exchange reaction of the pentyl isocyanide-palladium fine particle complex (a), as shown in FIG. 7, thus synthesided a phosphine ligand-palladium fine particle complex (b). Next, the target product was isolated by centrifugal separation, 40 mL of ethanol (product of Kanto Kagaku Co., Ltd.) was added, and centrifugal separation was continued, to obtain a phosphine ligand-palladium fine particle complex as a hydrogen storage material.

Analysis of Phosphine Ligand-Palladium Fine Particle Complex

Figure 8:
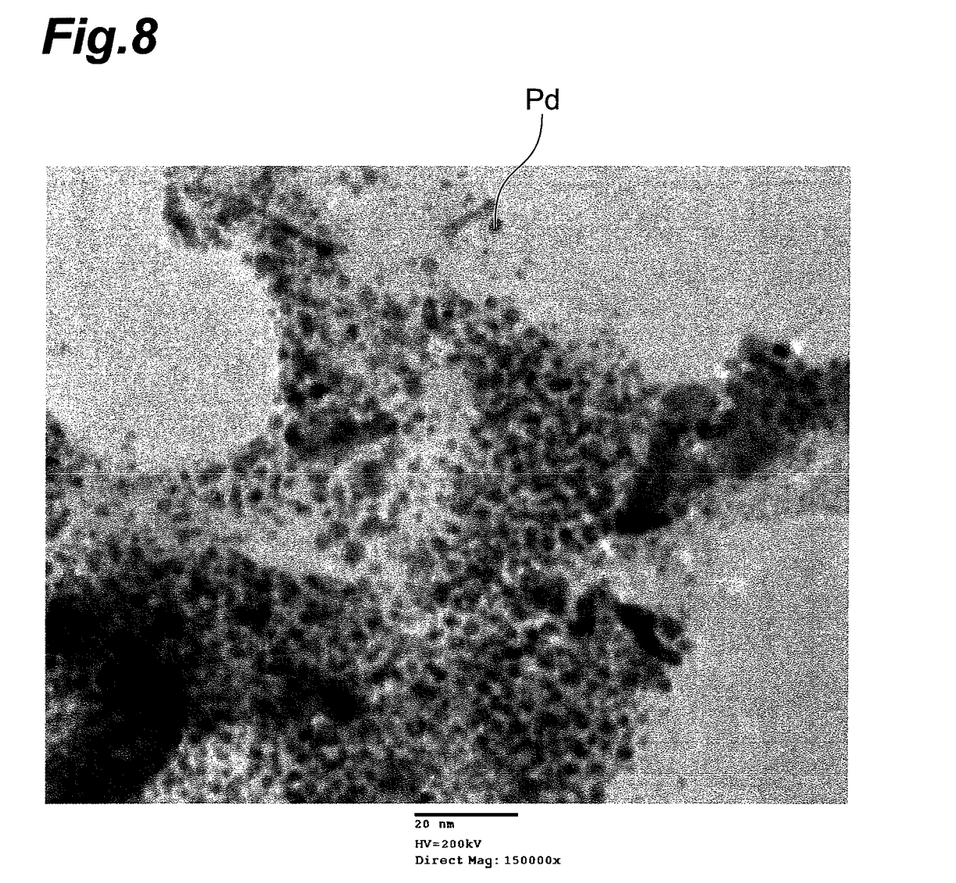
FIG. 8 is a transmission electron microscope photograph (150,000× magnification) of the hydrogen storage material obtained in Example 2.

The obtained phosphine ligand-palladium fine particle complex was analyzed with a transmission electron microscope (FE-TEM, Hitachi HF-2000). The obtained TEM image is shown in FIG. 8 (150,000× magnification). The TEM image in FIG. 8 was obtained by observing a material obtained by dropping a palladium fine particle dispersion comprising a phosphine ligand-palladium fine particle com- plex dispersed in chloroform, onto a board such as a TEM support film, and drying it in air at room temperature, and the "Pd" in the drawings are palladium fine particles. As a result of measuring the particle sizes of 150 arbitrary palladium fine particles from the TEM image, the mean particle size of the palladium fine particles was found to be 2.43 nm.

Example 3

Synthesis of Terpyridine Ligand-Palladium Fine Particle Complex

After suspending 56.9 mg (0.11 mmol) of 4',4''''-(1,4-phenylene)bis(2,2':6',2''-terpyridine) represented by the following formula (2) (product of Aldrich) and 1.20 g of the pentyl isocyanide-palladium fine particle complex obtained in Comparative Example 2 in 100 mL of dehydrated chloroform (product of Kanto Kagaku Co., Ltd.), under a nitrogen atmosphere, the mixture was stirred at room temperature for 8 days. This promoted ligand-exchange reaction in the same manner as Example 2, thus synthesizing a terpyridine ligand-palladium fine particle complex. Next, the target product was isolated by centrifugal separation, 40 mL of ethanol (product of Kanto Kagaku Co., Ltd.) was added, and centrifugal separation was continued, to obtain a terpyridine ligand-palladium fine particle complex as a hydrogen storage material.

[Chemical Formula 2]

(2)

Analysis of Terpyridine Ligand-Palladium Fine Particle Complex

Figure 9:
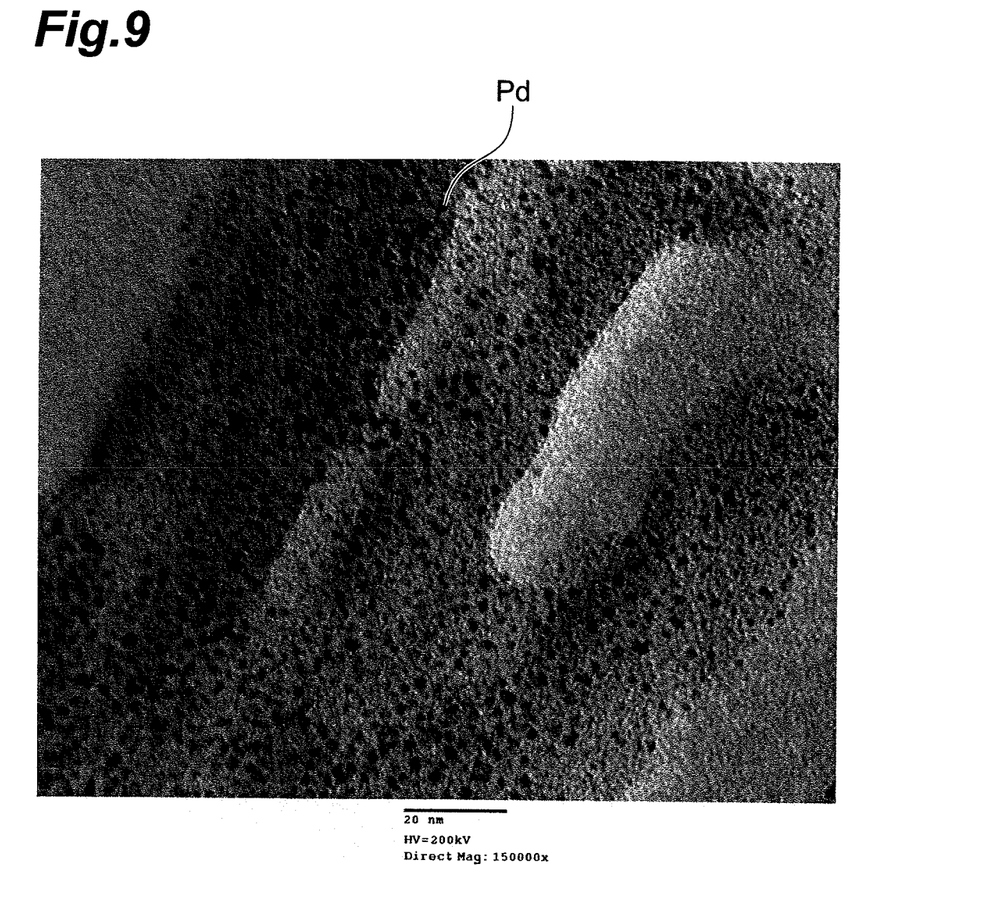
FIG. 9 is a transmission electron microscope photograph (150,000× magnification) of the hydrogen storage material obtained in Example 3.

The obtained terpyridine ligand-palladium fine particle complex was analyzed with a transmission electron microscope (FE-TEM, Hitachi HF-2000). The obtained TEM image is shown in FIG. 9 (150,000× magnification). The TEM image in FIG. 9 was obtained by observing a material obtained by dropping a palladium fine particle dispersion comprising a terpyridine ligand-palladium fine particle complex dispersed in chloroform, onto a board such as a TEM support film, and drying it in air at room temperature, and the "Pd" in the drawings are palladium fine particles. As a result of measuring the particle sizes of 150 arbitrary palladium fine particles from the TEM image, the mean particle size of the palladium fine particles was found to be 2.43 nm.

<Measurement of Hydrogen Storage Capacity>

Figure 10:
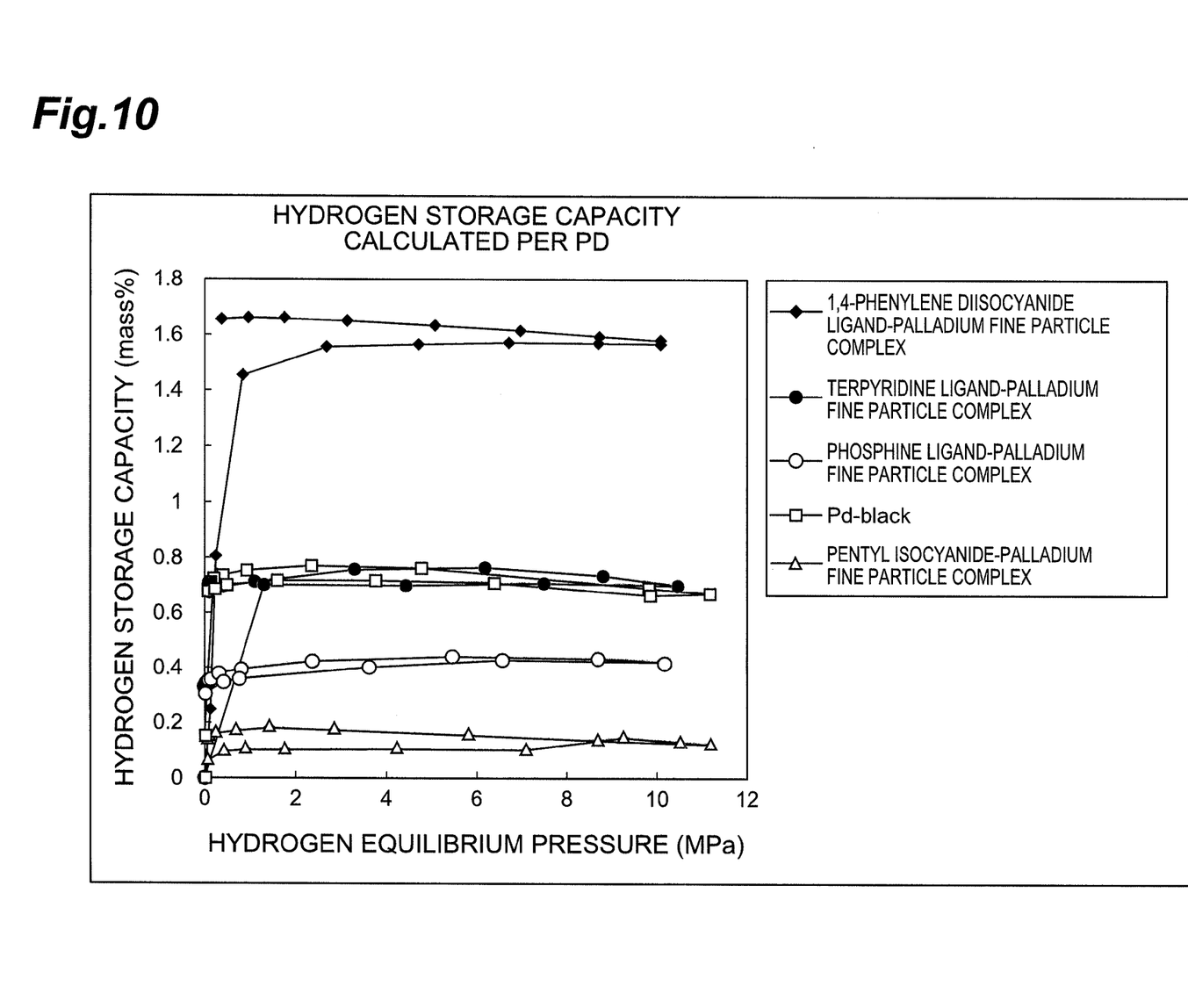
FIG. 10 is a graph showing the relationship between the equilibrium pressure and hydrogen storage capacity per Pd at a temperature of 303 K, for the hydrogen storage materials obtained in Examples 1-3 and Comparative Examples 1-2.

The hydrogen storage materials obtained in Examples 2 and 3 were used for measurement of the hydrogen storage capacity at a temperature of 303 K. The hydrogen storage capacity was measured using a hydrogen storage capacity measuring apparatus by Rhesca Corp., with the sample tube section in the hydrogen storage material immersed in a water tank at 303 K. The relationship between the equilibrium pressure and hydrogen storage capacity at 303 K is shown in FIG. 10. The hydrogen storage capacity shown in FIG. 10 is the hydrogen storage capacity calculated per Pd. The hydrogen storage capacity of the hydrogen storage materials obtained in Example 1 and Comparative Examples 1 and 2 are shown in FIG. 10, similarly calculated per Pd.

Table 1 shows the hydrogen storage capacities for the hydrogen storage materials obtained in Examples 1-3 and Comparative Examples 1 and 2, calculated per Pd, at a temperature of 303 K, and an equilibrium pressure of 10 MPa.

TABLE 1

| | Hydrogen storage capacity per Pd (mass %) |
|---|---|
| Example 1 | 1.57 |
| Example 2 | 0.42 |
| Example 3 | 0.70 |
| Comparative Example 1 | 0.67 |
| Comparative Example 2 | 0.13 |

In terms of hydrogen storage capacity calculated per Pd, the 1,4-phenylenediisocyanide-palladium fine particle complex (Example 1) and terpyridine ligand-palladium fine particle complex (Example 3) were superior to the hydrogen storage materials of Comparative Examples 1 and 2.

The phosphine ligand-palladium fine particle complex (Example 2) had lower hydrogen storage capacity per Pd than the palladium black (Comparative Example 1), but was superior in terms of ease of hydrogen introduction and removal. That is, the phosphine ligand-palladium fine particle complex (Example 2) had increased hydrogen storage capacity with increasing pressure, and clearly exhibited physical adsorption behavior. In contrast, after the hydrogen storage capacity had risen immediately at low pressure with the palladium black (Comparative Example 1), there was no further increase in the hydrogen storage capacity, and therefore the primary behavior was chemisorption.

Also, the phosphine ligand-palladium fine particle complex (Example 2) and terpyridine ligand-palladium fine particle complex (Example 3) were confirmed to have much greater hydrogen storage capacities per Pd compared to the pentyl isocyanide-palladium fine particle complex (Comparative Example 2) prior to ligand exchange, even though they were complexes with the same palladium fine particles. This suggested that the hydrogen storage materials of Examples 2 and 3 are capable of physical storage of hydrogen due to their structure.

INDUSTRIAL APPLICABILITY

As explained above, it is possible according to the invention to provide a hydrogen storage material with excellent hydrogen storage capacity.

The invention claimed is:

1. A hydrogen storage material comprising: metal fine particles with hydrogen storage capacity, and an organic compound that has at least two specific groups that can bind with the metal fine particles, and that is bonded with the metal fine particles by the specific groups; wherein the organic compound is selected from the group consisting of 1,4-phenylenediisocyanide, 4,4'-bis(diphenylphosphino)biphenyl, and 4',4''''-(1,4-phenylene)bis(2,2':6',2''-terpyridine).

2. The hydrogen storage material according to claim 1, wherein the metal fine particles comprise at least one type of metal selected from the group consisting of Pd, V, and Ti.

3. The hydrogen storage material according to claim 1, wherein the organic compound includes an aromatic ring.

4. The hydrogen storage material according to claim 1, which has a structure with two or more metal fine particles bonded through the organic compound.

5. The hydrogen storage material according to claim 4, wherein the metal fine particles comprise at least one type of metal selected from the group consisting of Pd, V, and Ti.

6. The hydrogen storage material according to claim 4, wherein the organic compound includes an aromatic ring.

7. The hydrogen storage material according to claim 4, which has a structure with two or more metal fine particles bonded through the organic compound.

* * * * *